(12) United States Patent
Von Winsor et al.

(10) Patent No.: US 9,217,911 B1
(45) Date of Patent: Dec. 22, 2015

(54) CAMERA ASSEMBLY HAVING A CAMERA SUPPORT SYSTEM WITH A BIASED HINGE AND RELATED METHODS

(71) Applicant: Sorenson Communications, Inc., Salt Lake City, UT (US)

(72) Inventors: Eric Von Winsor, West Jordan, UT (US); Doug Reynolds, Clinton, UT (US); Mark David Nelson, West Jordan, UT (US)

(73) Assignee: SORENSON COMMUNICATIONS, INC., Salt Lake City, UT (US)

( * ) Notice: Subject to any disclaimer, the term of this patent is extended or adjusted under 35 U.S.C. 154(b) by 0 days.

(21) Appl. No.: 14/630,452

(22) Filed: Feb. 24, 2015

(51) Int. Cl.
*G03B 17/56* (2006.01)

(52) U.S. Cl.
CPC .................... *G03B 17/561* (2013.01)

(58) Field of Classification Search
CPC ............................ G03B 17/561; H04N 5/2251
See application file for complete search history.

(56) References Cited

U.S. PATENT DOCUMENTS

| 6,738,094 B1 * | 5/2004 | Minami ................. F16M 13/02 248/166 |
| 8,475,059 B2 | 7/2013 | Khamsepoor et al. |

FOREIGN PATENT DOCUMENTS

CN          202035067          11/2011

* cited by examiner

*Primary Examiner* — W B Perkey
(74) *Attorney, Agent, or Firm* — TraskBritt

(57) ABSTRACT

A camera assembly having a camera support system that may include a first support member, a second support member, a first biased hinge, and a strap. The first support member may have a first end and a second end. The second support member may have a first end and second end. The first biased hinge may include the first end of the first support member, the first end of the second support member, a first pivoting rod, and the strap wrapped around the first pivoting rod. The camera support system may further include a second biased hinge. The second biased hinge may include the second end of the first support member, a second pivoting rod, a portion of a camera body, and the strap wrapped around the second pivoting rod.

19 Claims, 5 Drawing Sheets

CAMERA ASSEMBLY HAVING A CAMERA SUPPORT SYSTEM WITH A BIASED HINGE AND RELATED METHODS

FIELD

Embodiments of the disclosure generally relate to a camera assembly having a camera support system that has a biased hinge and methods for making the same.

BACKGROUND

Cameras are often mounted to display screens to accommodate activities such as video conferencing and video chatting. For example, some cameras can be used in conjunction with video phones for the hearing impaired who often communicate with sign language. Such video phones often communicate with a video relay service (VRS), in which hearing impaired users communicate with a sign language interpreter (also referred to as a call assistant) who facilitate communication with others who are hearing capable. The sign language interpreter speaks with the hearing capable user, and also engages with the hearing impaired user using sign language. While some devices (e.g., video phones) may have a camera built into the device, some devices may have a separate camera assembly that is mounted on a display screen.

Hinges within mounts of the cameras often cannot maintain a position of the mount due to the ease of moving components of the mounts about the hinges. Some hinges use washers in an attempt to keep tension on the hinges. These hinges often wear out after a limited number of uses. Some other mounts use springs to maintain torque on the hinges. These spring hinges often put too much pressure to the display screens or do not supply enough torque to keep a position of the mount.

BRIEF SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Some embodiments of the disclosure may include a camera support system. The camera support system may include a first support member having a first end and a second end and a second support having a first end and a second end. The first support member may be configured to support a camera body thereon. The camera support system may further include a first biased hinge that may include the first end of the first support member and the first end of the second support member. The first biased hinge may include a first pivoting rod that fixed relative to the second support member of the camera support system and a strap wrapped around the first pivoting rod.

Some embodiments of the disclosure may include a camera assembly, having a camera and a camera support system. The camera support system may include a first support member having a first end and a second end and a second support member having a first end and a second end. The camera support system may further include a first biased hinge and a second biased hinge. The first biased hinge may include the first end of the first support member, the first end of the second support member, and a first pivoting rod. The second biased hinge may include the second end of the first support member, a portion of a camera body of the camera, and a second pivoting rod. The camera support system may further include a strap extending through the first support member and wrapped, at least partially, around the first pivoting rod and the second pivoting rod.

Some embodiments of the disclosure include methods of making camera support systems. In some embodiments, a method of making a camera support system may include wrapping a strap around a first pivoting rod, disposing the strap in a channel defined by a first plate member and second plate member of a first support member, coupling the first pivoting rod to the first support member, and coupling the first pivoting rod to a second support member.

BRIEF DESCRIPTION OF THE DRAWINGS

The disclosure may be understood more fully by reference to the following detailed description of example embodiments, which are illustrated in the appended figures, in which.

DETAILED DESCRIPTION

Figure 1A:
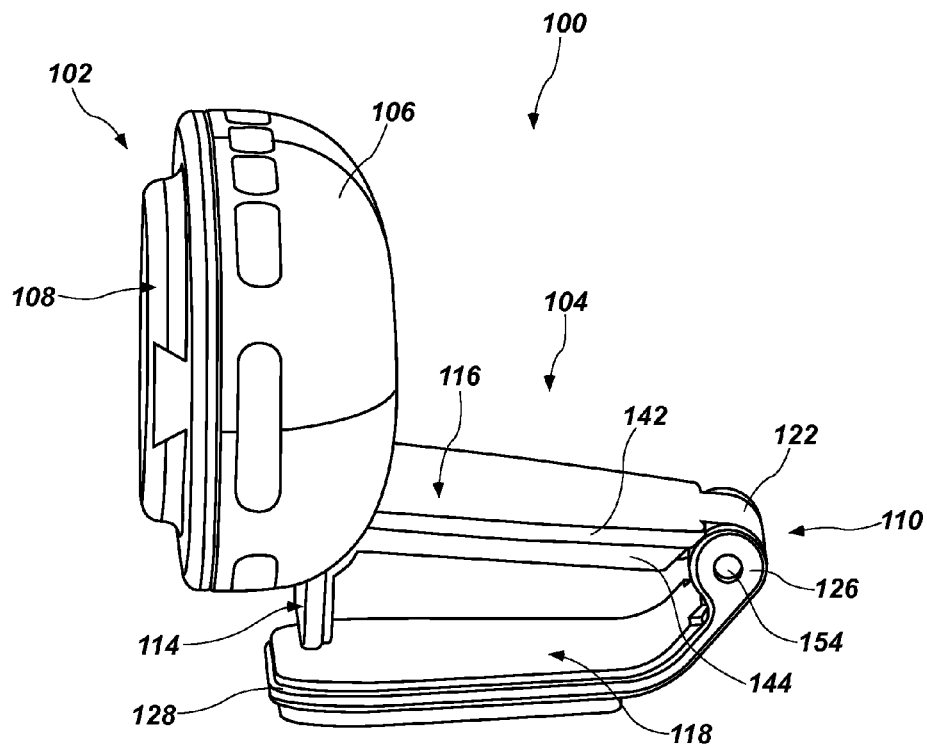
FIG. 1A is a perspective view a camera assembly according to an embodiment of the disclosure.

The illustrations presented herein are not meant to be actual views of any camera assembly, camera support system, or biased hinge, but are merely simplified schematic representations employed to describe illustrative embodiments of the disclosure. The drawings are not necessarily to scale.

The disclosure relates generally to camera assemblies, camera support systems, and biased hinges. In some embodiments, the biased hinge may require more force to bring the camera support system from a closed position to an open position than from an open position to the a closed position.

As used herein, any relational term, such as "first," "second," "over," "beneath," "top," "bottom," "underlying," "up," "down," "upper," "lower," etc., is used for clarity and convenience in understanding the disclosure and accompanying drawings and does not connote or depend on any specific preference, orientation, or order, except where the context clearly indicates otherwise. As used herein, the terms "vertical" and "horizontal" merely refer to a drawing figure as oriented on the drawing sheet, and in no way are limiting of orientation of camera assembly or any portion thereof.

Figure 1B:
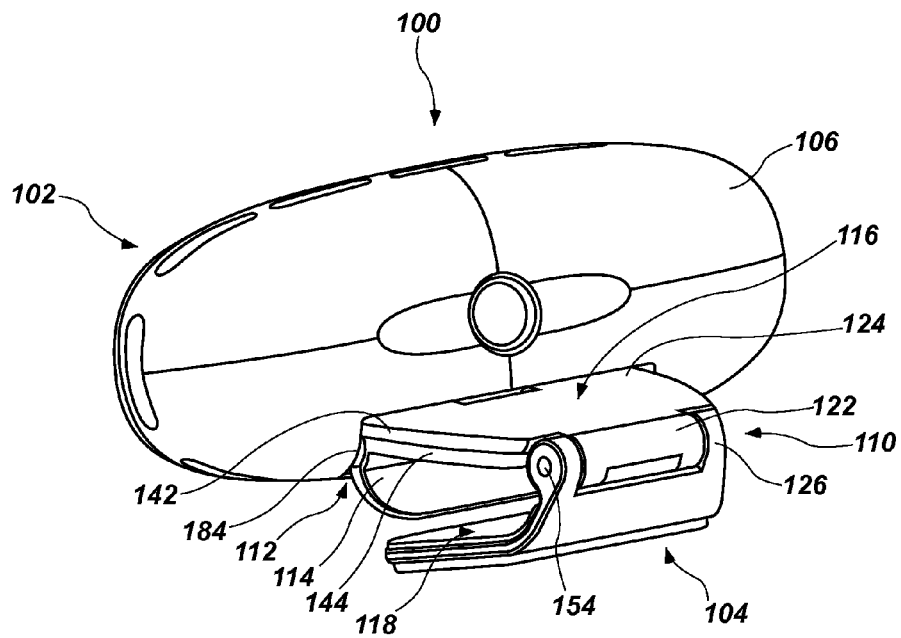
FIG. 1B is a rear perspective view of the camera assembly of FIG. 1A.

FIG. 1A is a perspective view of a camera assembly 100 according to an embodiment of the disclosure. FIG. 1B is a rear perspective view of the camera assembly 100 of FIG. 1A. FIG. 1A and FIG. 1B will be discussed together.

The camera assembly 100 may include a camera 102 and a camera support system 104. The camera 102 may include a camera body 106 and an image capturing system 108. The image capturing system 108 may be configured to generate video data as well as still image data. The camera support system 104 may include a first support member 116, a second support member 118, a first biased hinge 110, and a second biased hinge 112. As used herein, the term "biased" when used in relation to either the first biased hinge 110 or the second biased hinge 112 means that more force is required to rotate a member extending from the hinge about the hinge in a first direction than is required to rotate the member about the hinge in a second direction opposite the first direction.

The first support member 116 may include a first end 122 and a second end 124 with an elongated portion therebetween. The first support member 116 may further include a top plate 142, a bottom plate 144. Thus, in some embodiments, the elongated portion between the first end 122 and the second end 124 may be divided into multiple pieces (e.g., the top plate 142 and the bottom plate 144). The bottom plate 144 may include a catch member 144 that extends orthogonally from the main portion of the bottom plate 144. Thus, the catch member 114 may be integrally formed with the bottom plate 144. In some embodiments, top plate 142 may include a downward-extending portion to form the catch member 114. Thus, the catch member 144 may comprise portions of the top plate 142, the bottom plate 144, or a combination thereof. In some embodiments, the catch member 144 may be a separate piece that is connected to the elongated portion of the bottom plate 144 and/or the top plate 142.

The second support member 118 may also include a first end 126 and a second end 128 and an elongated portion therebetween. The first end 122 of the first support member 116 may be coupled to the first end 126 of the second support member 118 to form at least a part of the first biased hinge 110. As a result, the first support member 116 and the second support member 118 may rotate relative to each other about the first biased hinge 110. As used herein, the terms "rotate," "rotatable," and "rotating" refer to rotating about an axis disposed in an at least substantially horizontal plane from the perspectives depicted in the figures.

For example, the first biased hinge 110 may include a first pivoting rod 154. Each of the first support member 116 and the second support member 118 may be coupled to the first pivoting rod 154 such that the first support member 116 and second support member 118 are rotatable relative to each other about the first pivoting rod 154. For example, the first end 122 of the first support member 116 may wrap at least partially around the first pivoting member 154. The first end 126 of the second support member 118 may couple to the first pivoting rod 154 on the ends thereof. Thus, the first end 126 of the second support member 118 may fit on the outer portion of the first pivoting rod 154 with the first end 122 of the first support member 116 fitting on the inner portion of the first pivoting rod 154. In some embodiments, the configuration may be reversed, in which the first end 126 of the second support member 118 may wrap at least partially around the first pivoting member 154, and the first end 122 of the first support member 118 may couple to the first pivoting rod 154 on the ends thereof. Thus, the first end 122 of the first support member 116 may fit on the outer portion of the first pivoting rod 154 with the first end 126 of the second support member 118 fitting on the inner portion of the first pivoting rod 154. It is contemplated that other configurations may likewise enable coupling the support members 116, 118 to the first pivoting rod 154 such that at least one of the first support member 116 and the second support member 118 may be rotatable about the first pivoting rod 154.

The catch member 114 may comprise portions of one or more of the top plate 142 and bottom plate 144 of the first support member 116. The catch member 114 may be used to assist in mounting the camera support system 104 to an object.

The second end 128 of the second support member 118 may be free. In other words, the second end 128 of the second support member 118 may not be coupled to any other portion of the camera support system 104.

The second end 124 of the first support member 116 may be coupled to the camera body 106 to form at least part of the second biased hinge 112. As a result, the first support member 116 and the camera body 106 may rotate relative to each other about the second biased hinge 112.

Figure 2:
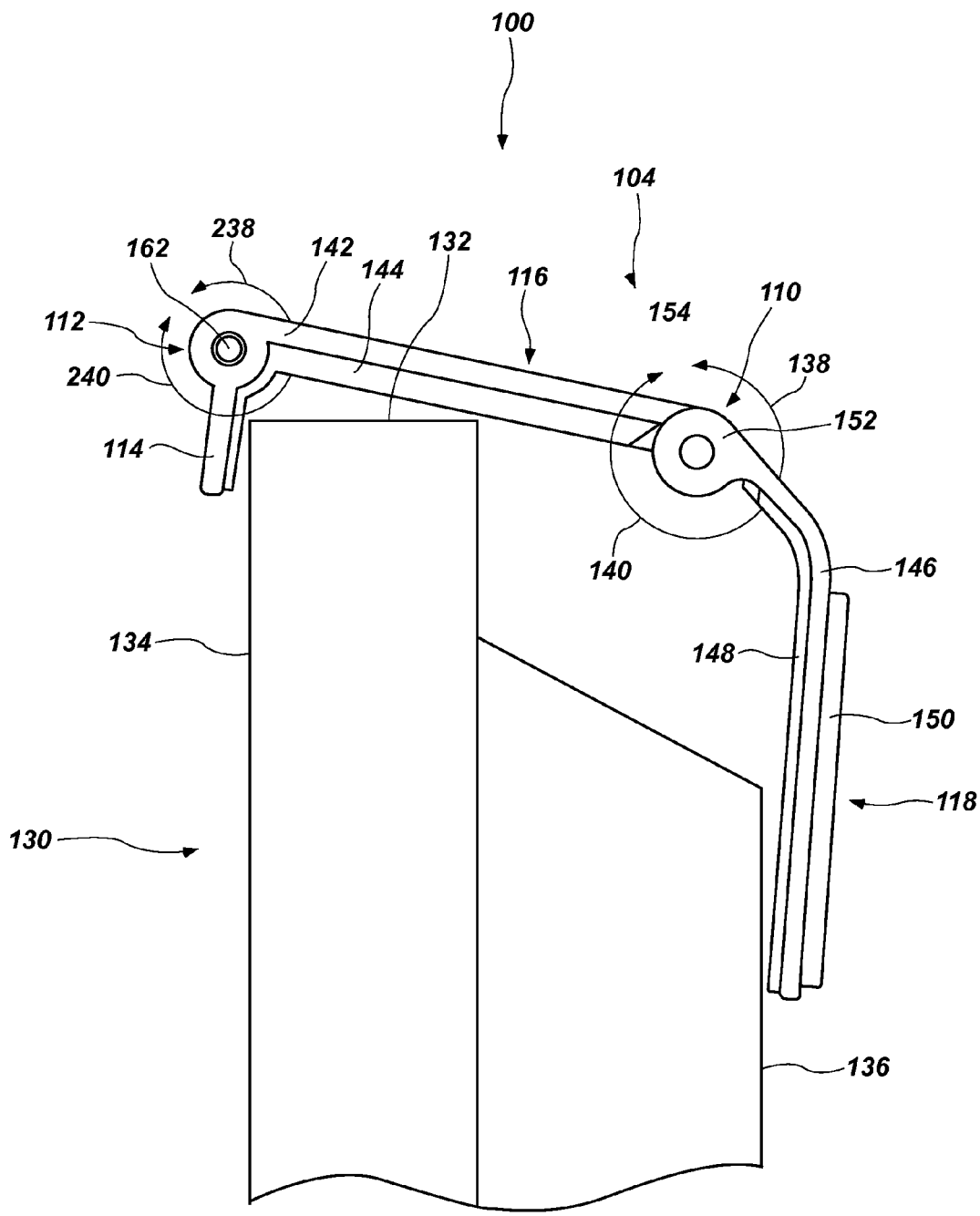
FIG. 2 is a side view of the camera support system of the camera assembly of FIGS. 1A and 1B mounted on a top of an object.
Figure 3:
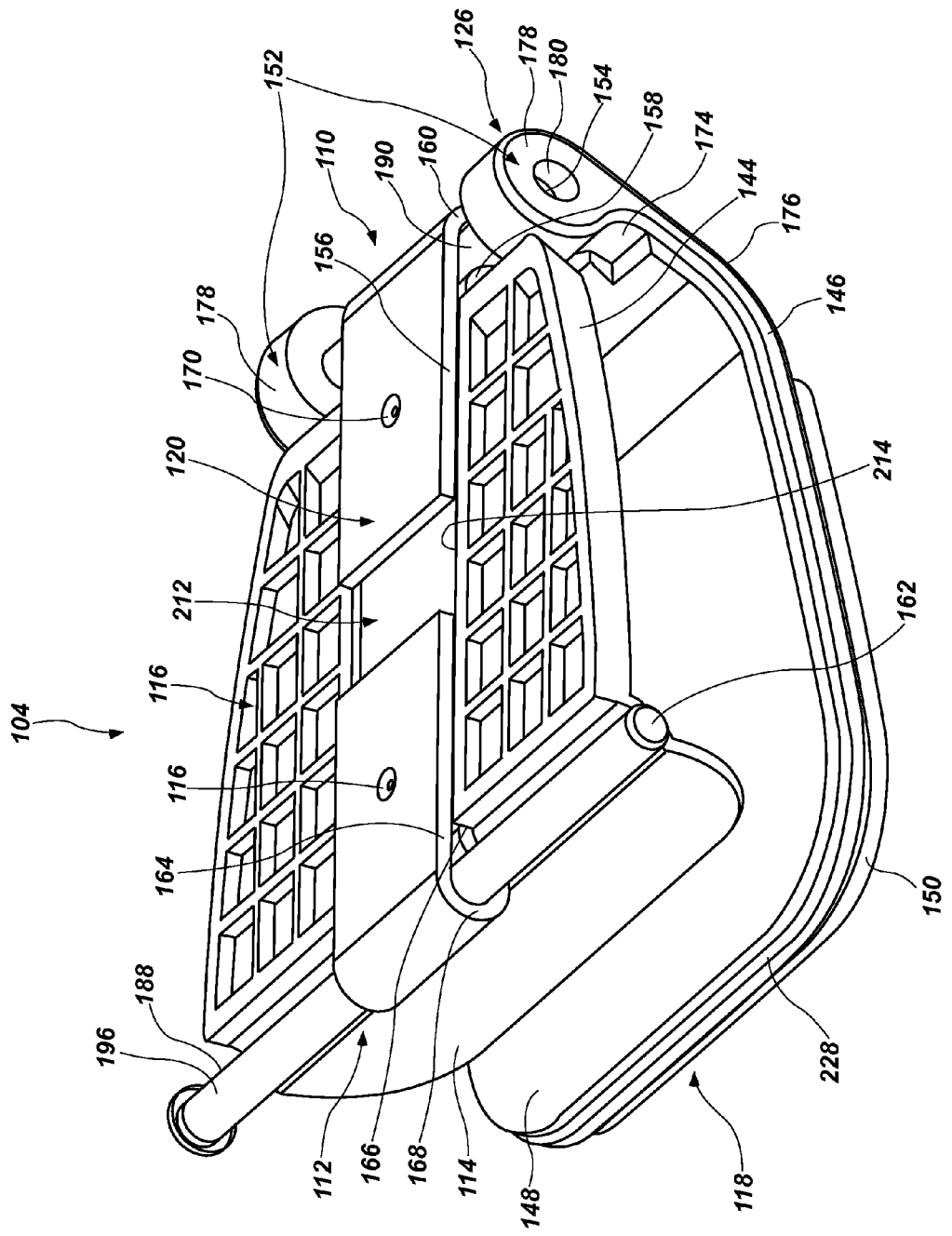
FIG. 3 is a perspective view of a camera support system according to an embodiment of the disclosure.

For example, the second biased hinge 112 may include a second pivoting rod 162 (FIGS. 2 and 3). The second pivoting rod 162 may be oriented at least substantially parallel to the first pivoting rod 154 on the opposite side of the first support member 116 and the second support member 118. In some embodiments, each of the first support member 116 and the camera body 106 may be coupled to the second pivoting rod 162. For example, the second end 124 of the first support member 116 may wrap at least partially around the second pivoting rod 162. At least a portion of the first supporting member 116 and the second pivoting rod 162 may fit within a cavity of the camera body 106. At least a portion of the camera body 106 may couple to the ends of the second pivoting rod 162. Thus, the camera body 106 may fit on the outer portion of the second pivoting rod 162 with the second end 124 of the first support member 116 fitting on the inner portion of the second pivoting rod 162. As a result, one or more of the first support member 116 and the camera body 106 may be rotatable about the second pivoting rod 162 such that the first support member 116 and the camera body 106 are rotatable relative to each other about the second pivoting rod 162.

In operation of the first biased hinge 110, the camera support system 104 may be able to be opened and closed to fit a contour of an object and to provide stability to the camera assembly 100. As used herein, the term "open" in relation to an action performed on the camera support system 104 means displacing the second end 128 of the second support member 118 away from the second end 124 of the first support member 116 while rotating one or more of the first support member 116 and the second support member 118 about the first biased hinge 110. As used herein, the term "close" in relation to an action performed on the camera support system 104 means displacing the second end 128 of the second support member 118 and the second end 124 of the first support member 116 closer together while rotating one or more of the first support member 116 and second support member 118 about the first biased hinge 110. Such rotation may be useful for proper positioning of the camera support system 104 when mounting the camera support system 104 on an object. In some embodiments, more force may be required to open the camera support system 104 than to close the camera support system 104. In other embodiments, more force may be required to close the camera support system 104 than to open the camera support system 104.

In operation of the second biased hinge 112, the camera body 106 may be rotated relative to the first support member 116, which may result in tilting the camera 106 forward or backward. Such rotation may be useful for adjusting the camera 106 to be level after the camera support system 104 is mounted on an object.

FIG. 2 is a side view of the camera support system 104 of the camera assembly 100 of FIGS. 1A and 1B mounted on a top of an object 130. The camera 102 is not shown in FIG. 2 in order to better show the operation and the structure of the camera support system 104. As described herein, the camera support system 104 is referred to as being mounted to a TV 130; however, this is only done for convenience in describing the operation of the camera support system 104, and it is contemplated that the camera support system 104 may be used to mount a camera 102 on a variety of objects including a TV, monitor, lap top screen, projector screen, display screen, or any portion thereof, as well as any other object to which a user may desire to mount a camera 102 (FIG. 1A) and/or image capturing system 108 (FIG. 1A). The camera support system 104 may be used to secure a camera 102 to an object while the user moves to be located within the field of view or to stabilize the camera 102.

In some embodiments, the camera support system 104 may be mounted on the TV 130 by placing the camera support system 104 over the top 132 of the TV 130 with the catch member 114 disposed to a front 134 of the TV 130 and the first support member 116 and second support member 118 disposed to a back 136 of the TV 130. The camera support system 104 may be opened and/or closed to fit a contour of the back 136 of the TV 130 and to provide stability to the camera assembly 100. For example, the camera support system 104 may be opened or closed, based on the contour of the back 136 of the TV 130, in order to maintain contact between the catch member 114 of the camera support system 104 and the front 134 of the TV 130.

In some embodiments, more force may be required to open the camera support system 104 than to close the camera support system 104. The camera support system 104 may be configured to be more difficult to open than to close in order to maintain a position of the second support member 118 against the contour of the back 136 of the TV 130 and a position of the catch member 114 against the front 134 of the TV 130. As discussed above, the first biased hinge 110 may be configured to require more force to open the camera support system 104 than to close the camera support system 104. For example, in some embodiments, more force may be required to rotate the second support member 118 about the first biased hinge 110 in a counterclockwise direction 138, from the perspective depicted in FIG. 2, than may be required to rotate the second support member 118 about the first biased hinge 110 in a clockwise direction 140. Accordingly, in some embodiments, more force may be required to open the camera support system 104 than to close the camera support system 104. In some embodiments, the camera support system 104 may be closed around the TV 130 such that there is pressure against the front 134 of the TV 130 and the back 136 of the TV 130. Requiring more force to open the camera support system 104 may maintain the pressure against the TV 130 and may provide additional stability to the camera assembly 100.

Requiring more force to open the camera support system 104 may provide advantages over conventional camera support systems by providing consistent stability when supporting a camera assembly 100 on the TV 130. For example, when placing the camera support system 104 on a TV 130, a user may open and/or close the camera support system 104 until the camera assembly 100 is stable on the TV 130 with the catch member 114 of the camera support system 104 against the front 134 of the TV 130 and the second support member 118 against the back 136 of the TV 130. Once the camera support system 104 is stable and adjusted to the user's preference, the first biased hinge 110 may prevent the camera support system 104 from further opening, and thus, may prevent the camera support system 104 from slipping off the TV 130. In contrast, conventional camera support systems may open naturally due to the weight of the camera assembly 100 and may not be able to maintain stability on the TV 130.

In some embodiments, more force may be required to close the camera support system 104 than to open the camera support system 104. Requiring more force to close the camera support system 104 may provide advantages over conventional camera support systems by providing consistent stability when supporting a camera assembly 100 on, for example, a flat surface such that the camera body 106 (FIG. 1A) is elevated on the camera support system 104 above the flat surface. For example, when placing the camera assembly 100 and camera support system 104 on a flat surface, a user may open and/or close the camera support system 104 until the camera assembly 100 is oriented according to a user's preference. Once the camera support system 104 is stable and adjusted to the user's preference, the first biased hinge 110 may prevent the camera support system 104 from further closing, and thus, may prevent the camera support system 104 from changing the camera assembly's 100 orientation without direct manipulation from a user. In contrast, conventional camera support systems may close naturally due to the weight of the camera assembly and may not be able to maintain an open position on a flat surface.

In some embodiments, more force may be required to rotate the camera body 106 (FIG. 1A) about the second biased hinge 112 in a clockwise direction 240, from the perspective depicted in FIG. 2, than may be required to rotate the camera body 106 (FIG. 1A) about the second biased hinge 112 in a counterclockwise direction 238. Requiring more force rotate the camera body 106 (FIG. 1A) about the second biased hinge 112 in a clockwise direction 240 may assist in countering any tendency a camera body 106 (FIG. 1A) may have in rotating about the second biased hinge 112 in a clockwise direction 240 due to a weight of the camera body 106 (FIG. 1A).

In some embodiments, more force may be required to rotate the camera body 106 (FIG. 1A) about the second biased hinge 112 in a counterclockwise direction 238, from the perspective depicted in FIG. 2, than may be required to rotate the camera body 106 (FIG. 1A) about the second biased hinge 112 in a clockwise direction 240. Requiring more force to rotate the camera body 106 (FIG. 1A) about the second biased hinge 112 in a counterclockwise direction 238 may provide advantages when using the camera assembly 100 while the camera assembly 100 is mounted on a TV 130, wherein the top 132 of the TV 130 is higher than an area at which the camera body 106 (FIG. 1A) and image capturing system 108 (FIG. 1A) are pointed. For example, when the camera assembly 100 is mounted on a top 132 of a TV 130 that is higher than an area at which the camera body 106 (FIG. 1A) and image capturing system 108 (FIG. 1A) are pointed, the camera body 106 (FIG. 1A) may be pointed downward and may have a tendency to rotate about the second biased hinge 112 in a counterclockwise direction 238, from the perspective depicted in FIG. 2, due to a weight of the camera body 106 (FIG. 1A) and image capturing system 108 (FIG. 1A). Therefore, requiring more force to rotate the camera body 106 (FIG. 1A) about the second biased hinge 112 in a counterclockwise direction 238 may prevent the camera body 106 (FIG. 1A) from rotating about second biased hinge 112 in a counterclockwise direction 238 when using the camera assembly 100 on the top 132 of a TV 130 that is higher than an area at which the camera body 106 (FIG. 1A) and image capturing system 108 (FIG. 1A) are pointed. Furthermore, requiring more force to rotate the camera body 106 (FIG. 1A) about the second biased hinge 112 in a counterclockwise direction 238 may assist the camera assembly 100 in maintaining a position when using the camera assembly 100 on the top 132 of a TV 130 that is higher than an area at which the camera body 106 (FIG. 1A) and image capturing system 108 (FIG. 1A) are pointed.

FIG. 3 is perspective view of the camera support system 104 depicted in FIGS. 1A and 1B with the top plate 142 removed in order to better show the operation and the structure of the camera support system 104. As shown in FIG. 3, the camera support system 104 may further include a strap 120 extending between first pivoting rod 154 and the second pivoting rod 162. In some embodiments, the top plate 142 (FIG. 1A) and bottom plate 144 of the first support member 116 may define a channel 214 therebetween, and the strap 120 may extend through the channel 214. As a result, the strap 120 may be disposed between the top plate 142 and the bottom plate 144.

The strap 120 may be coupled to the first pivoting rod 154 and the second pivoting rod 162 such that portions of the strap 120 wrap around the respective pivoting rods 154, 162. For example, the strap 120 may include a first wrap portion 160, a first upper portion 156, a first lower portion 158, a second wrap portion 168, a second upper portion 164, and a second lower portion 166. The first wrap portion 160 of the strap 120 may be wrapped around the first pivoting rod 154. The first upper portion 156 and first lower portion 158 of the strap 120 may extend from the first wrap portion 160 and away from the first pivoting rod 154, through the channel 214, and towards the second pivoting rod 162. The first upper portion 156 may have a tilted general teardrop shape. The second wrap portion 168 of the strap 120 may be wrapped around the second pivoting rod 162. The second wrap portion 168 may have a tilted general teardrop shape. The second upper portion 164 and second lower portion 166 of the strap 120 may extend from the second wrapped portion and away from the second pivoting rod 162, through the channel 214, and towards the first pivoting rod 154.

In some embodiments, the first lower portion 158 and second lower portion 166 may be connected, and the first upper portion 156 and second upper portion 164 may have a gap 212 therebetween. In other embodiments, the first lower portion 158 and the second lower portion 166 may have a gap therebetween, and the first upper portion 156 and second upper portion 164 may be connected. In some embodiments, the upper portions 156, 164 and lower portions 158, 166 may be configured such that they abut each other, or are otherwise formed or connected, such that there is essentially no gap therebetween.

As shown in FIG. 3, the first pivoting rod 154 and second pivoting rod 162 may be oriented such that the lengths of the first pivoting rod 154 and second pivoting rod 162 are oriented parallel to each other. The first pivoting rod 154 and second pivoting rod 162 may extend in at least substantially horizontal planes. In some embodiments, the lengths of the pivoting rods 154, 162 may be different lengths. For example, as shown in FIG. 3 the length of the first pivoting rod 154 is shorter relative to the second pivoting rod 162. Other relative lengths are contemplated, including the lengths being the same.

The camera support system 104 may further include a first fastener 170 and a second fastener 172 extending vertically through the strap 120. The first fastener 170 and second fastener 172 are discussed in greater detail below in regard to FIGS. 4A and 4B.

The second support member 118 may include a center plate portion 146, a first cushion portion 148, a second cushion portion 150, and a first clevis portion 152. The first cushion portion 148 may be attached to a top surface 174 of the center plate portion 146 of the second support member 118, and the second cushion portion 150 may be attached to a bottom surface 176 of the center plate portion 146 of the second support member 118. The first clevis portion 152 of the second support member 118 may be disposed proximate the first end 126 of the second support member 118. The first clevis portion 152 may have two at least substantially parallel ends 178. Each end 178 of the first clevis portion 152 may have a respective hole 180, wherein the respective holes 180 of the ends 178 have a common central axial extending through center points of the respective holes 180.

The first pivoting rod 154 of the first biased hinge 110 may extend between the two ends 178 of the first clevis portion 152 of the second support member 118 and may extend at least partially into the respective hole 180 of each end of the two ends 178 of the first clevis portion 152 of the second support member 118. The first pivoting rod 154 may have one end having at least one flat surface (not shown). One of the holes 180 in an end 178 of the first clevis portion 152 correlating to the end of the first pivoting rod 154 having at least one flat surface may also have a flat surface, such that rotation of the first pivoting rod 154 relative to the second support member 118 is prevented.

The second pivoting rod 162 of the second biased hinge 112 may extend between a second clevis portion 184 (FIG. 1B) of the camera body 106 (FIG. 1B) and may extend at least partially into two opposing holes in the second clevis portion 184 (FIG. 1B) of the camera body 106 (FIG. 1B). The second pivoting rod 162 may have one end having at least one flat surface 188, and a hole of the two opposing holes correlating to the end of the second pivoting rod 162 having at least one flat surface 188 may also have a flat surface, such that rotation of the second pivoting rod 162 relative to the camera body 106 (FIG. 1B) is prevented.

Figure 4A:
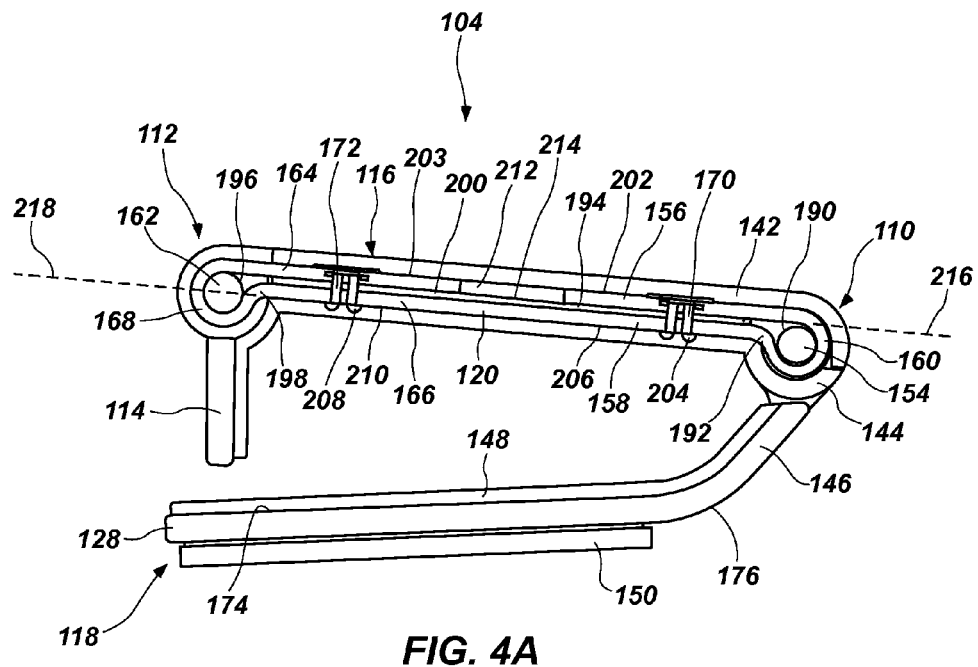
FIG. 4A is a cross-sectional side view of the camera support system of FIG. 2.
Figure 4B:
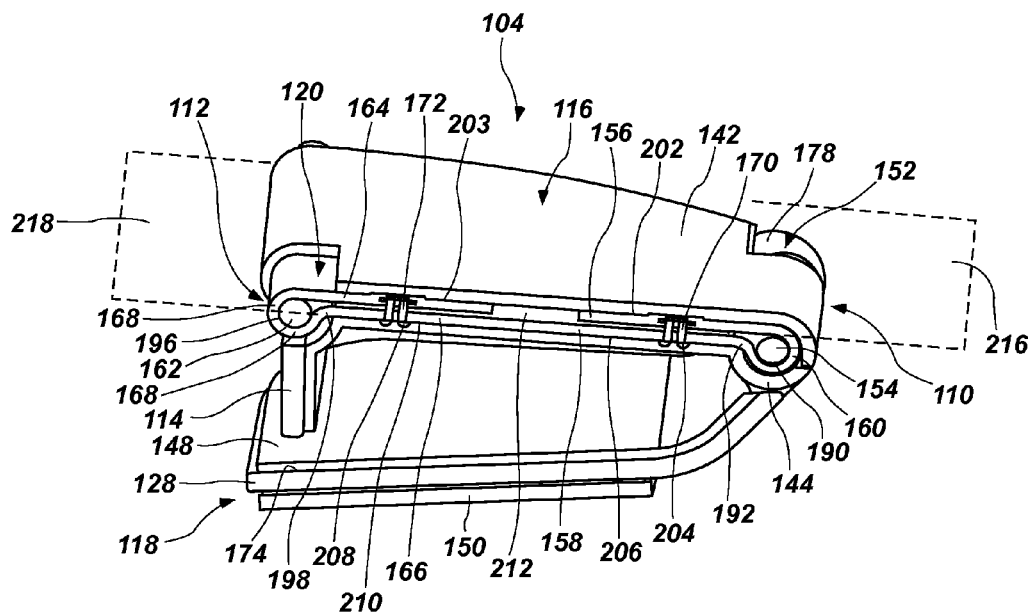
FIG. 4B is a cross-sectional perspective view of the camera support system of FIG. 2.

FIG. 4A is a cross-sectional side view of the camera support system 104 of FIG. 2. FIG. 4B is a cross-sectional perspective view of the camera support system 104 of FIG. 2. As with FIG. 2, the camera 102 is removed in FIGS. 4A and 4B to better show the structure and operation of the camera support system 104. The first biased hinge 110 may include the first pivoting rod 154, the first upper portion 156 of the strap 120, the first lower portion 158 of the strap 120, and the first wrap portion 160 of the strap 120. The second biased hinge 112 may include the second pivoting rod 162, the second upper portion 164 of the strap 120, the second lower portion 166 of the strap 120, and the second wrap portion 168 of the strap 120. In some embodiments, the camera support system 104 may not include a spring in the first biased hinge 110 or the second biased hinge 112. In some embodiments, the strap 120 may not comprise a spring.

In some embodiments, the top plate 142 of the first support member 116 may be attached to the bottom plate 144 of the first support member 116. In other embodiments, the top plate 142 and the bottom plate 144 may comprise a single integral body. In some embodiments, the top plate 142 may at least partially wrap around the first biased hinge 110 and the second biased hinge 112. The catch member 114 may extend from a portion of the top plate 142 that curls around the second biased hinge 112. The catch member 114 may extend towards the second support member 118 of the camera support system 104 when the camera support system 104 is in a closed position. As discussed above, in some embodiments, a portion of the bottom plate 144 may abut up against the catch member 114 such that the portion of the bottom plate 144 forms a part of the catch member 114.

As discussed above, the strap 120 may be disposed in the channel 214 defined between the top plate 142 and the bottom plate 144 of the first support member 116. The first wrap portion 160 of the strap 120 may wrap around the first pivoting rod 154 of the first biased hinge 110. In some embodiments, the first upper portion 156 of the strap 120 may extend from the first wrap portion 160 and away from the first pivoting rod 154 along a first plane 216 that is oriented at least substantially tangential to a first outer surface 190 of the first pivoting rod 154. The first upper portion 156 may further extend towards the second upper portion 164 of the strap 120. In some embodiments, the first lower portion 158 of the strap 120 may extend from the first wrap portion 160 of the strap 120 and away from the first pivoting rod 154 along a second plane 218 that is oriented at least substantially normal to the first outer surface 190 of the first pivoting rod 154. For example, in some embodiments, the first lower portion 158 of the strap 120 may have a first bend 192 in the first lower portion 158 proximate the first pivoting rod 154 to allow the first lower portion 158 of the strap 120 to extend away from the first pivoting rod 154 along the second plane 218. In some embodiments, the first upper portion 156 and first lower portion 158 of the strap 120 may be at least substantially parallel to each other. In some embodiments, there may be a first space 194 between the first upper portion 156 and first lower portion 158 of the strap 120.

In some embodiments, the second wrap portion 168 of the strap 120 may wrap around the second pivoting rod 162 of the second biased hinge 112. In some embodiments, the second upper portion 164 of the strap 120 may extend from the second wrap portion 168 and away from the second pivoting rod 162 along the first plane 216, which may be oriented at least substantially tangential to a second outer surface 196 of the second pivoting rod 162. The second upper portion 164 may further extend towards the first upper portion 156 of the strap 120. In some embodiments, the second lower portion 166 of the strap 120 may extend from the second wrap portion 168 of the strap 120 and away from the second pivoting rod 162 along the second plane 218, which may be oriented at least substantially normal to the second outer surface 196 of the second pivoting rod 162. For example, in some embodiments, the second lower portion 166 of the strap 120 may have a second bend 198 in the second lower portion 166 to allow the second lower portion 166 of the strap 120 to extend away from the second pivoting rod 162 along the second plane 218. In some embodiments, the second upper portion 164 and second lower portion 166 of the strap 120 may be at least substantially parallel to each other. In some embodiments, there may be a second space 200 between the second upper portion 164 and second lower portion 166 of the strap 120.

In some embodiments, the first lower portion 158 of the strap 120 and the second lower portion 166 of the strap 120 may be connected. In some embodiments, an upper surface 202 of the first upper portion 156 of the strap 120 and an upper surface 203 of the second upper portion 164 of the strap 120 may be at least substantially coplanar. In some embodiments, there may be a gap 212 between the first upper portion 156 of the strap 120 and the second upper portion 164 of the strap 120 along the first plane 216 such that the first upper portion 156 and second upper portion 164 are not connected.

In some embodiments, the camera support system 104 may include only the first biased hinge 110 and may include a non-biased hinge in place of the second biased hinge 112. For example, in such embodiments, the strap 120 may include the first upper portion 156, first lower portion 158, and first wrap portion 160 but may be missing one or more of the second upper portion 164, second lower portion 166, and second wrap portion 168. In other embodiments, the camera support system may include only the second biased hinge 112 and may include a non-biased hinge in place of the first biased hinge 110. For example, in such embodiments, the strap 120 may include the second upper portion 164, second lower portion 166, and second wrap portion 168 but may be missing one or more of the first upper portion 156, first lower portion 158, and first wrap portion 160.

Referring again to FIGS. 4A and 4B together, the first fastener 170 may extend through the first upper portion 156 and first lower portion 158 of the strap 120. In some embodiments, the first fastener 170 may at least substantially prevent movement of the first lower portion 158 and first upper portion 156 of the strap 120 relative to each other in directions parallel to the upper surface 202 of the first upper portion 156. In some embodiments, the first fastener 170 may at least substantially permit movement of the first lower portion 158 and first upper portion 156 relative to each other in directions at least substantially perpendicular to the upper surface 202 of the first upper portion 156. In some embodiments, the first fastener 170 may have a first cap 204 disposed at one end of the first fastener 170. For example, in some embodiments, the first fastener 170 may have a first cap 204 at one end of the first fastener 170 that may abut up against a lower surface 206 of the first lower portion 158 of the strap 120 when the first fastener 170 is extending through the first upper portion 156 and the first lower portion 158 of the strap 120. The first cap 204 disposed on one end of the first fastener 170 may at least substantially prevent the first fastener 170 from being pulled out of the first lower portion 158 of the strap 120 in a direction towards the first upper portion 156 of the strap 120 by mechanical interference between the first cap 204 and the lower surface 206 of the first lower portion 158.

In some embodiments, the first fastener 170 may be fixed to one or more of the first upper portion 156 and first lower portion 158 of the strap 120 such that whichever of the first upper portion 156 or first lower portion 158 is fixed to the first fastener 170 may not move relative to the first fastener 170. For example, in some embodiments, the first fastener 170 may be fixed to the first upper portion 156 of the strap 120 and may not be fixed to the first lower portion 158 of the strap 120 such that the first lower portion 158 of the strap 120 is free to move along a length of the first fastener 170. In such embodiments, the length of the first fastener 170 may limit how large the first space 194 between the first upper portion 156 and first lower portion 158 may become during use. In other embodiments, the first fastener 170 may not be fixed to either of the first upper portion 156 or first lower portion 158 of the strap 120. In such embodiments, the first upper portion 156 and first lower portion 158 of the strap 120 may be free to move along the length of the first fastener 170. In yet other embodiments, the first fastener 170 may be fixed to the first lower portion 158 of the strap 120 and may not be fixed to the first upper portion 156 of the strap 120 such that the first lower portion 158 is free to move along the length of the first fastener 170.

The second fastener 172 may be similar to the first fastener 170 and may extend through the second upper portion 164 and second lower portion 166 of the strap 120. In some embodiments, the second fastener 172 may at least substantially prevent movement of the second lower portion 166 and second upper portion 164 of the strap 120 relative to each other in directions parallel to the upper surface 202 of the second upper portion 164. In some embodiments, the second fastener 172 may at least substantially permit movement of the second lower portion 166 and second upper portion 164 relative to each other in directions at least substantially perpendicular to the upper surface 203 of the second upper portion 164. In some embodiments, the second fastener 172 may have a second cap 208 disposed at one end of the second fastener 172. For example, in some embodiments, the second fastener 172 may have a second cap 208 at one end of the second fastener 172 that may abut up against a lower surface 210 of the second lower portion 166 of the strap 120 when the second fastener 172 is extending through the second upper portion 164 and the second lower portion 166 of the strap 120. The second cap 208 disposed on one end of the second fastener 172 may at least substantially prevent the second fastener 172 from being pulled out of the second lower portion 166 of the strap 120 in a direction towards the second upper portion 164 of the strap 120 by mechanical interference between the second cap 208 and the lower surface 210 of the second lower portion 166.

In some embodiments, the second fastener 172 may be fixed to one or more of the second upper portion 164 and second upper portion 164 of the strap 120 such that whichever of the second upper portion 164 or second lower portion 166 is fixed to the second fastener 172 may not move relative to the second fastener 172. For example, in some embodiments, the second fastener 172 may be fixed to the second upper portion 164 of the strap 120 and may not be fixed to the second lower portion 166 of the strap 120 such that the second lower portion 166 of the strap 120 is free to move along a length of the second fastener 172. In such embodiments, the length of the second fastener 172 may limit how large the second space 200 between the second upper portion 164 and second lower portion 166 may become during use. In other embodiments, the second fastener 172 may not be fixed to either of the second upper portion 164 or second lower portion 166 of the strap 120. In such embodiments, the second upper portion 164 and second lower portion 166 of the strap 120 may be free to move along the length of the second fastener 172. In yet other embodiments, the second fastener 172 may be fixed to the second lower portion 166 of the strap 120 and may not be fixed to the second upper portion 164 of the strap 120 such that the second lower portion 166 is free to move along the length of the second fastener 172.

In some embodiments, the first and second fasteners 170, 172 may comprise one or more of a rivet, screw, nail, column of material, bolt, and any other known fastener. In some embodiments, clearances between the first fastener 170 and the first upper and lower portions 156, 158 may be sufficient to allow for some movement of the first upper and lower portions 156, 158 relative to each other in directions parallel to the upper surface 202 of the first upper portion 156. In some embodiments, clearances between the second fastener 172 and the second upper and lower portions 164, 166 may be sufficient to allow for some movement of the second upper and lower portions 164, 166 relative to each other in directions parallel to the upper surface 203 of the second upper portion 164. In some embodiments, the camera support system 104 may not include the first or second fasteners 170, 172.

For clarity, discussion of the operation of the first biased hinge 110 is presented below. Referring to FIGS. 4A and 4B together, in operation, when the camera support system 104 is opened, rotational forces created on the first wrap portion 160 of the strap 120 by the first pivoting rod 154 rotating in a counterclockwise direction 138 (FIG. 2), and torque placed on the first biased hinge 110 by opening the camera support system 104 may cause the first space 194 between the first upper portion 156 and first lower portion 158 of the strap 120 to decrease. The gap 212 between the first upper portion 156 and second upper portion 164 may facilitate decreasing the first space 194 between the first upper portion 156 and first lower portion 158 by allowing free movement of the first upper portion 156 relative to the first lower portion 158. In some embodiments, the first support member 116 may bend, which may further cause the first space 194 between the first upper portion 156 and first lower portion 158 to decease. In other embodiments, the first support member 116 may not substantially bend.

As the first space 194 between the first upper portion 156 and first lower portion 158 deceases, one or more of the first upper portion 156 and first lower portion 158 may slide along the first fastener 170. Decreasing the first space 194 between the first upper portion 156 and first lower portion 158 may cause the first wrap portion 160, wrapped around the first pivoting rod 154, to become wrapped tighter around the first pivoting rod 154. In other words, decreasing the first space 194 between the first upper portion 156 and first lower portion 158 may decrease clearances, if any, between the first wrap portion 160 and the first pivoting rod 154. Wrapping the first wrap portion 160 of the strap 120 tighter around the first pivoting rod 154 may, for example, pinch (i.e., squeeze, grip, grasp, press against, etc.) the first pivoting rod 154 with the first wrap portion 160. Furthermore, wrapping the first wrap portion 160 of the strap 120 tighter around the first pivoting rod 154 may increase normal forces placed on the first outer surface 190 of the first pivoting rod 154 by the first wrap portion 160 of the strap 120. Increasing the normal forces placed on the first outer surface 190 of the first pivoting rod 154 by the first wrap portion 160 of the strap 120 may increase frictional forces between the first outer surface 190 of the first pivoting rod 154 and the first wrap portion 160 of the strap 120 opposing rotation of the first pivoting rod 154 within the first wrap portion 160 as the first pivoting rod 154 rotates within the first wrap portion 160. Increasing frictional forces that oppose rotation of the first pivoting rod 154 within the first wrap portion 160 of the strap 120 may increase a force required to rotate the first pivoting rod 154 within the first wrap portion 160 in a counterclockwise direction 138 (FIG. 2). Thus, increased force may be required to open the camera support system 104.

Contrariwise, in operation, when the camera support system 104 is closed, rotational forces created on the first wrap portion 160 of the strap 120 by the first pivoting rod 154 rotating in a clockwise direction 140 (FIG. 2), and the torque placed on the first biased hinge 110 by opening the camera support system 104 may cause the first space 194 between the first upper portion 156 and first lower portion 158 of the strap 120 to increase. The gap 212 between the first upper portion 156 and second upper portion 164 may facilitate increasing the first space 194 between the first upper portion 156 and first lower portion 158 by allowing free movement of the first upper portion 156 relative to the first lower portion 158. In some embodiments, the first support member 116 may bend, which may further cause the first space 194 between the first upper portion 156 and first lower portion 158 to increase. In other embodiments, the first support member 116 may not substantially bend.

As the first space 194 between the first upper portion 156 and first lower portion 158 increases, one or more of the first upper portion 156 and first lower portion 158 may slide along the first fastener 170. Increasing the first space 194 between the first upper portion 156 and first lower portion 158 may cause the first wrap portion 160, wrapped around the first pivoting rod 154, to become wrapped looser around the first pivoting rod 154. In other words, increasing the first space 194 between the first upper portion 156 and first lower portion 158 may increase clearances between the first wrap portion 160 and the first pivoting rod 154. Loosening the first wrap portion 160 of the strap 120 around the first pivoting rod 154 may decrease normal forces placed on the first outer surface 190 of the first pivoting rod 154 by the first wrap portion 160 of the strap 120. Decreasing the normal forces placed on the first outer surface 190 of the first pivoting rod 154 by the first wrap portion 160 of the strap 120 may decrease frictional forces between the first outer surface 190 of the first pivoting rod 154 and the first wrap portion 160 of the strap 120 opposing rotation of the first pivoting rod 154 within the first wrap portion 160 as the first pivoting rod 154 rotates within the first wrap portion 160. Decreasing frictional forces that oppose rotation of the first pivoting rod 154 within the first wrap portion 160 of the strap 120 may decrease a force required to rotate the first pivoting rod 154 within the first wrap portion 160 in a clockwise direction 140 (FIG. 2). Thus, less force may be required to close the camera support system 104 than to open the camera support system 104.

For clarity, discussion of the operation of the second biased hinge 112 is presented below. In operation, when the camera body 106 (FIG. 1A) is adjusted by rotating the camera body 106 in a clockwise direction 240 (FIG. 2), rotational forces created on the second wrap portion 168 of the strap 120 by the second pivoting rod 162 rotating in a clockwise direction 240 (FIG. 2), from the perspective depicted in FIG. 4A, and torque placed on the second biased hinge 112 by rotating the camera body 106 (FIG. 1A) in a clockwise direction 240 (FIG. 2) may cause the second space 200 between the second upper portion 164 and second lower portion 166 of the strap 120 to decrease. The gap 212 between the second upper portion 164 and first upper portion 156 may facilitate decreasing the second space 200 between the second upper portion 164 and second lower portion 166 by allowing free movement of the second upper portion 164 relative to the second lower portion 166. In some embodiments, the first support member 116 may bend, which may further cause the second space 200 between the second upper portion 164 and second lower portion 166 to decease. In other embodiments, the first support member 116 may not substantially bend.

As the second space 200 between the second upper portion 164 and second lower portion 166 decreases, one or more of the second upper portion 164 and second lower portion 166 may slide along the second fastener 172. Decreasing the second space 200 between the second upper portion 164 and second lower portion 166 may cause the second wrap portion 168, wrapped around the second pivoting rod 162, to become wrapped tighter around the second pivoting rod 162. In other words, decreasing the second space 200 between the second upper portion 164 and second lower portion 166 may decrease clearances, if any, between the second wrap portion 168 and the second pivoting rod 162. Wrapping the second wrap portion 168 of the strap 120 tighter around the second pivoting rod 162 may, for example, pinch (i.e., squeeze, grip, grasp, press against, etc.) the second pivoting with the second wrap portion 168. Furthermore, wrapping the second wrap portion 168 of the strap 120 tighter around the second pivoting rod 162 may increase normal forces placed on the second outer surface 196 of the second pivoting rod 162 by the second wrap portion 168 of the strap 120. Increasing the normal forces placed on the second outer surface 196 of the second pivoting rod 162 by the second wrap portion 168 of the strap 120 may increase frictional forces between the second outer surface 196 of the second pivoting rod 162 and the second wrap portion 168 of the strap 120 opposing rotation of the second pivoting rod 162 within the second wrap portion 168 as the second pivoting rod 162 rotates within the second wrap portion 168. Increasing frictional forces that oppose rotation of the second pivoting rod 162 within the second wrap portion 168 of the strap 120 may increase a force required to rotate the second pivoting rod 162 within the second wrap portion 168 in a clockwise direction 240 (FIG. 2). Thus, increased force may be required to rotate to camera body 106 about the second biased hinge 112 in a clockwise direction 240 (FIG. 2).

Contrariwise, in operation, when the camera body 106 (FIG. 1A) is rotated about the second hinge in a counterclockwise direction 238, rotational forces created on the second wrap portion 168 of the strap 120 by the second pivoting rod 162 rotating in a counterclockwise direction 238 (FIG. 2), and the torque placed on the second biased hinge 112 by rotating the camera body 106 about the second hinge in a counterclockwise direction 238 (FIG. 2) may cause the second space 200 between the second upper portion 164 and second lower portion 166 of the strap 120 to increase. The gap 212 between the second upper portion 164 and first upper portion 156 may facilitate increasing the second space 200 between the second upper portion 164 and second lower portion 166 by allowing free movement of the second upper portion 164 relative to the second lower portion 166. In some embodiments, the first support member 116 may bend, which may further cause the second space 200 between the second upper portion 164 and second lower portion 166 to increase. In other embodiments, the first support member 116 may not substantially bend.

As the second space 200 between the second upper portion 164 and second lower portion 166 increases, one or more of the second upper portion 164 and second lower portion 166 may slide along the second fastener 172. Increasing the second space 200 between the second upper portion 164 and second lower portion 166 may cause the second wrap portion 168, wrapped around the second pivoting rod 162, to become wrapped looser around the second pivoting rod 162. In other words, increasing the second space 200 between the second upper portion 164 and second lower portion 166 may increase clearances between the second wrap portion 168 and the second pivoting rod 162. Loosening the second wrap portion 168 of the strap 120 around the second pivoting rod 162 may decrease normal forces placed on the second outer surface 196 of the second pivoting rod 162 by the second wrap portion 168 of the strap 120. Decreasing the normal forces placed on the second outer surface 196 of the second pivoting rod 162 by the second wrap portion 168 of the strap 120 may decrease frictional forces between the second outer surface 196 of the second pivoting rod 162 and the second wrap portion 168 of the strap 120 opposing rotation of the second pivoting rod 162 within the second wrap portion 168 as the second pivoting rod 162 rotates within the second wrap portion 168. Decreasing frictional forces that oppose rotation of the second pivoting rod 162 within the second wrap portion 168 of the strap 120 may decrease a force required to rotate the second pivoting rod 162 within the second wrap portion 168 in a counterclockwise direction 138. Thus, less force may be required to rotate the camera body 106 (FIG. 1A) about the second biased hinge 112 in a counterclockwise direction 238 (FIG. 2) than to rotate the camera body 106 (FIG. 1A) about the second biased hinge 112 in a clockwise direction 240.

In some embodiments, the camera body 106 (FIG. 1A), the top and bottom plates 142, 144 of the first support member 116, and center plate portion 146 of the second support member 118 may comprise, for example, one or more of plastics, metals, and metal alloys. For example, in some embodiments, the camera body 106, the top and bottom plates 142, 144 of the first support member 116, and center plate portion 146 of the second support member 118 may comprise one or more of polyethylene and polypropylene. In other embodiments, the camera body 106 (FIG. 1A), the top and bottom plates 142, 144 of the first support member 116, and center plate portion 146 of the second support member 118 may comprise one or more of aluminum, copper, steel, stainless steel, and zinc. In some embodiments, the one or more of the camera body 106 (FIG. 1A), the top and bottom plates 142, 144 of the first support member 116, and center plate portion 146 of the second support member 118 may comprise a material that is different from another of the camera body 106, the top and bottom plates 142, 144 of the first support member 116, and center plate portion 146 of the second support member 118.

In some embodiments, the first and second pivoting rods 154, 162 may comprise one or more of a plastic, metal, or metal alloy. For example, in some embodiments, the first and second pivoting rods 154, 162 may comprise stainless steel. In some embodiments, the first pivoting rod 154 may comprise a different material than the second pivoting rod 162 comprises. For example, in some embodiments, the first pivoting rod 154 may comprise stainless steel and the second pivoting rod 162 may comprise a plastic such as polyethylene and polypropylene.

In some embodiments, the strap 120 may comprise a plastic, for example, polyethylene, polypropylene, or any combination thereof. In other embodiments, the strap 120 may comprise one or more of a metal and metal alloy. For example, in some embodiments the strap 120 may comprise one or more of aluminum, copper, steel, stainless steel, and zinc. As a non-limiting example, in some embodiments, the strap 120 may comprise stainless steel. In other embodiments, the strap 120 may comprise cold rolled steel. In some embodiments, the strap 120 may be plated with a metal or metal alloy. For example, in some embodiments, the strap 120 may comprise a cold rolled steel strap plated with a clear zinc plate.

In some embodiments, the strap 120 may be made of a material that is softer than a material of which the first and second pivoting rods 154, 162 are made. For example, in some embodiments, the strap 120 may be made of aluminum and the pivoting rods 154, 162 may be made of stainless steel.

Figure 5A:
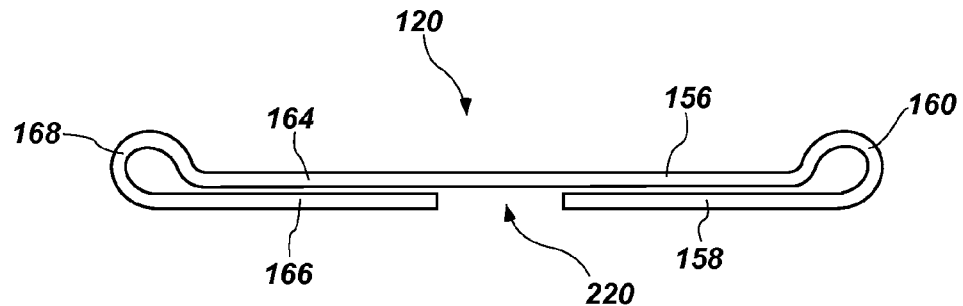
FIG. 5A is a side view of a strap of the camera support system according to another embodiment of the disclosure.

FIG. 5A is a side view of the strap 120 in the opposite orientation. In other words, the first and second upper portions 156, 164 of the strap 120 may be connected, and the strap 120 may include a gap 220 between the first and second lower portions 158, 166. When the strap 120 is in an opposite orientation, the operation of the strap 120 may be opposite as well. For example, when the strap 120 is in an opposite orientation, more force may be required to close the camera support system 104 (FIG. 3) than to open the camera support system 104.

Figure 5B:
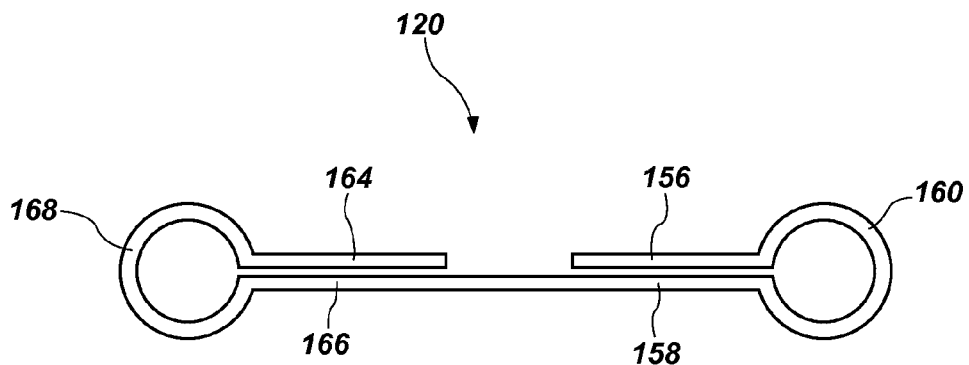
FIG. 5B is a side view of a strap of the camera support system according to another embodiment of the disclosure.

Also as shown in FIG. 5A, in some embodiments, the first lower portion 158 may extend from the first wrap portion 160 and away from the first pivoting rod 154 in a direction that is at least substantially tangential to the first outer surface 190 of the first pivoting rod 154 (FIG. 3). The first upper portion 156 may extend from the first wrap 160 portion in a manner that is parallel to the first lower portion 158. In some embodiments, the first upper portion 156 may extend from the first wrap portions 160 and away from the first pivoting rod 154 in a direction that is at least substantially normal to the first outer surface 190 of the first pivoting rod 154. As shown in FIG. 5B, in some embodiments, the second lower portion 166 may extend from the second wrap portion 168 and away from the second pivoting rod 162 (FIG. 3) in a direction that is at least substantially tangential to the second outer surface 196 of the second pivoting rod 162 (FIG. 3). The second upper portion 164 may extend from the second wrap 168 portion in a manner that is parallel to the second lower portion 166. In some embodiments, the second upper portion 164 may extend from the second wrap portion 168 and away from the second pivoting rod 162 (FIG. 3) in a direction that is at least substantially normal to the second outer surface 196 of the second pivoting rod 162. In the opposite orientation, the first and second wrap portions 160, 168 may each have a tilted general teardrop shape.

FIG. 5B is a side view of the strap 120 according to another embodiment of the disclosure. As shown in FIG. 5B, the strap 120 of the camera support system 104 (FIG. 3) may not include any portions that extend from the first and second wrap portions 160, 168 in a direction at least substantially tangential to the first or second outer surfaces 190, 196 (FIG. 3) of the first and second pivoting rods 154, 162 (FIG. 3). Rather, as shown in FIG. 5B, in some embodiments, the first upper portion 156 and the first lower portion 158 may extend from the first wrap portion 160 in a direction that is generally perpendicular to the first outer surface 190 of the first pivoting rod 154. In such embodiments, the second upper portion 164 and the second lower portion 166 may extend from the second wrap portion 168 in a direction that is generally perpendicular to the second outer surface 196 of the second pivoting rod 162. In such embodiments, the first and second wrap portions 160, 168 may have a generally circular shape.

Figure 5C:
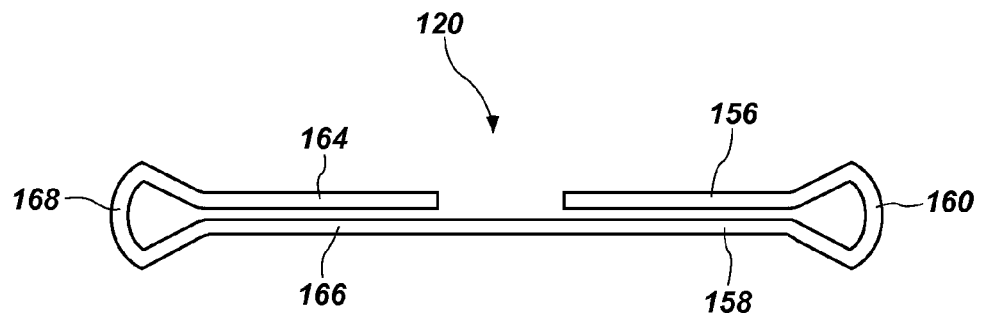
FIG. 5C is a side view of a strap of the camera support system according to another embodiment of the disclosure.

FIG. 5C is a side view of the strap 120 according to another embodiment of the disclosure. As shown in FIG. 5C, the strap 120 may include a strap similar to the strap 120 shown in FIG. 5B except that the first and second wrap portions 160, 168 have a generally triangular shape. Other shapes are also contemplated.

Although embodiments described herein typically have discussed the camera support system 104 including a single strap 120, in some embodiments the camera support system 104 may include more than one strap. For example, the camera support system 104 may include two straps, including a first strap for coupling to the first pivoting rod 154, and a second strap for coupling to the second pivoting rod 162. The first strap may include the first upper portion 156, the first lower portion 158, and the first wrap portion 160, and the second strap may include the second upper portion 164, the second lower portion 166, and the second wrap portion 168. In embodiments including a first strap and a second strap, the first lower portion 158 of the first strap and the second lower portion 166 of the second strap may be fixed to the bottom plate 144 and/or the top plate 142 of the first support member 116 of the camera support system 104 such that the first and second lower portions 158, 166 may not substantially move relative to the bottom plate 144 of the first support member 116. In some embodiments, the first strap and the second strap may comprise the same material. In other embodiments, the first strap and second strap may comprise different materials. As another non-limiting example, the camera support system 104 may include a first strap that is oriented parallel to a second strap. In such an embodiment, both the first strap and second strap may comprise the any of the straps previously discussed herein.

The example embodiments of the disclosure described above do not limit the scope of the invention, since these embodiments are merely examples of embodiments of the invention, which is defined by the scope of the appended claims and their legal equivalents. Any equivalent embodiments are intended to be within the scope of this invention. Indeed, various modifications of the disclosure, in addition to those shown and described herein, such as alternate useful combinations of the elements described, will become apparent to those skilled in the art from the description. Such modifications and embodiments are also intended to fall within the scope of the appended claims.

What is claimed is:

1. A camera support system, comprising:
    a first support member having a first end and a second end, the first support member configured to support a camera body thereon;
    a second support member having a first end and a second end;
    a first biased hinge comprising the first end of the first support member and the first end of the second support member; and
    a second biased hinge comprising the second end of the first support member.

2. A camera support system, comprising:
    a first support member having a first end and a second end, the first support member configured to support a camera body thereon;
    a second support member having a first end and a second end; and
    a first biased hinge comprising:
        the first end of the first support member and the first end of the second support;
        a first pivoting rod fixed relative to the second support member; and
        a strap disposed within the first support member, and wrapped around the first pivoting rod.

3. The camera support system of claim 2, wherein the strap comprises:
    a first wrap portion at least partially wrapped around the first pivoting rod;
    a first upper portion extending from the first wrap portion and away from the first pivoting rod along a first plane; and
    a first lower portion extending from the first wrap portion and away from the first pivoting rod along a second plane that is at least substantially parallel to the first plane.

4. The camera support system of claim 3, further comprising:
    a second biased hinged comprising the second end of the first support member and a second pivoting rod, wherein the strap further comprises:
        a second wrap portion wrapped around the second pivoting rod;
        a second upper portion extending from the second wrap portion and away from the second pivoting rod along the first plane; and
        a second lower portion extending from the second wrap portion and away from the second pivoting rod along the second plane.

5. The camera support system of claim 4, wherein the first lower portion of the strap and the second lower portion of the strap are connected, and wherein the first upper portion of the strap and the second upper portion of the strap have a gap therebetween.

6. The camera support system of claim 2, the strap at least substantially comprising first material and the first pivoting rod at least substantially comprising a second material, wherein the first material is softer than the second material.

7. A camera assembly, comprising:
    a camera; and
    a camera support system comprising:
        a first support member having a first end and a second end;
        a second support member having a first end and a second end;
        a first biased hinge comprising the first end of the first support member, the first end of the second support member, and a first pivoting rod;
        a second biased hinge comprising the second end of the first support member, a portion of a camera body of the camera, and a second pivoting rod; and
        a strap extending through the first support member and wrapped at least partially around the first pivoting rod and the second pivoting rod.

8. The camera assembly of claim 7, wherein the strap comprises:
    a first wrap portion wrapped at least partially around the first pivoting rod;
    a first upper portion extending from the first wrap portion and away from the first pivoting rod along a first plane; and
    a first lower portion extending from the first wrap portion and away from the first pivoting rod along a second plane that is at least substantially parallel to the first plane.

9. The camera assembly of claim 8, wherein the strap further comprises:
    a second wrap portion wrapped around the second pivoting rod;
    a second upper portion extending from the second wrap portion and away from the second pivoting rod along the first plane; and
    a second lower portion extending from the second wrap portion and away from the second pivoting rod along the second plane.

10. The camera assembly of claim 9, wherein the first lower portion of the strap and the second lower portion of the strap are connected and wherein the first upper portion of the strap and the second upper portion of the strap have a gap therebetween.

11. The camera assembly of claim 9, further comprising:
    a first fastener extending through the first upper portion of the strap and the first lower portion of the strap; and
    a second fastener extending through the second upper portion of the strap and the second lower portion of the strap.

12. The camera assembly of claim 7, wherein the first support member comprises:
    a top plate;
    a bottom plate connected to the top plate, wherein the top plate and the bottom plate define a channel, and wherein the strap extends through the channel.

13. The camera assembly of claim 7, further comprising a catch member for placing against a front of a display screen.

14. The camera assembly of claim 7, the first biased hinge further comprising a clevis portion of the second support member, wherein the first pivoting rod extends between opposing holes in the clevis portion of the second support member, and wherein the clevis portion of the second support member is fixed relative to the first pivoting rod.

15. A method of making a camera support system, the method comprising:
    wrapping a strap around a first pivoting rod;
    disposing the strap in a channel defined by a first plate member and second plate member of a first support member;
    coupling the first pivoting rod to the first support member; and
    coupling the first pivoting rod to a second support member.

16. The method of making a camera support system of claim 15, the method further comprising wrapping the strap around a second pivoting rod.

17. The method of making a camera support system of claim 16, wherein wrapping a strap around a first pivoting rod and wrapping the strap around a second pivoting rod comprises:

wrapping a first portion of the strap around the first pivoting rod in a first direction; and wrapping a second portion of the strap around the second pivoting rod in a second direction opposite the first direction.

18. The method of making a camera support system of claim 16, the method further comprising:

disposing the first pivoting rod to extend between two opposing holes of a first clevis portion of the second support member; and disposing the second pivoting rod to extend between two opposing holes of a second clevis portion of a camera body.

19. The method of making a camera support system of claim 15, further comprising wrapping the strap around the first pivoting rod such that a wrap portion of the strap wraps around the first pivoting rod, a first portion of the strap extends from the wrap portion of the strap away from the first pivoting rod and along a first plane, and a second portion of the strap extend from the wrap portion of the strap away from the first pivoting rod and along a second plane that is parallel to the first plane.

\* \* \* \* \*